US011522859B2

(12) United States Patent
Zahed

(10) Patent No.: US 11,522,859 B2
(45) Date of Patent: *Dec. 6, 2022

(54) SYSTEMS AND METHODS FOR FACILITATING AUTHENTICATION OF EMAILS SENT BY 3$^{rd}$ PARTIES

(71) Applicant: SHOPIFY INC., Ottawa (CA)

(72) Inventor: Aref Zahed, Toronto (CA)

(73) Assignee: SHOPIFY INC., Ottawa (CA)

( * ) Notice: Subject to any disclaimer, the term of this patent is extended or adjusted under 35 U.S.C. 154(b) by 287 days.

This patent is subject to a terminal disclaimer.

(21) Appl. No.: 16/582,185

(22) Filed: Sep. 25, 2019

(65) Prior Publication Data

US 2021/0092118 A1    Mar. 25, 2021

(51) Int. Cl.
*H04L 9/40* (2022.01)
*G06Q 10/10* (2012.01)
(Continued)

(52) U.S. Cl.
CPC ....... *H04L 63/0884* (2013.01); *G06Q 10/107* (2013.01); *H04L 51/42* (2022.05); *H04L 61/4511* (2022.05); *H04L 67/52* (2022.05)

(58) Field of Classification Search
CPC . H04L 63/0884; H04L 51/22; H04L 61/1511; H04L 67/18; G06Q 10/107
(Continued)

(56) References Cited

U.S. PATENT DOCUMENTS 8,719,900 B2   5/2014  MacCarthaigh
10,447,633 B2  10/2019 Gupta
(Continued)

OTHER PUBLICATIONS

Anonymous: "Adding an SPF record for a 3rd party, but don't have one for my own domain," XP055739045, Nov. 5, 2015, 3 pages. Retrieved from the Internet: https://serverfault.com/questions/734297/adding-an-spf-record-for-a-3rd-party-but-dont-have-one-for-my-own-domain (retrieved on Oct. 12, 2020).
(Continued)

*Primary Examiner* — Alan S Chou

(57) ABSTRACT

A company may authorize a 3$^{rd}$ party to send emails on behalf of the company's domain. The emails are sent by the 3$^{rd}$ party, but the "From" portion of the email header is populated with the company's email address/domain. Methods are disclosed that, in some embodiments, enable email authentication (e.g. SPF record checks and/or DKIM verification) for emails sent by the 3$^{rd}$ party on behalf of a company's domain. In some embodiments, a trusted entity is enlisted to communicate with the 3$^{rd}$ party and the company. The trusted entity has the proper permissions to request changes in the DNS records of the company. The trusted entity receives the request from the 3$^{rd}$ party to add email authentication information to the DNS record. The trusted entity confirms that the 3$^{rd}$ party is authorized by the company and then adds the information to the DNS record.

24 Claims, 12 Drawing Sheets

(51) Int. Cl.
  *H04L 51/42*    (2022.01)
  *H04L 61/4511*  (2022.01)
  *H04L 67/52*    (2022.01)

(58) Field of Classification Search
  USPC .......................................................... 726/4
  See application file for complete search history.

(56) References Cited

U.S. PATENT DOCUMENTS

| | | | |
|---|---|---|---|
| 2005/0216587 A1* | 9/2005 | John | H04L 63/101 |
| | | | 709/225 |
| 2007/0067465 A1* | 3/2007 | Blinn | H04L 29/12594 |
| | | | 709/229 |
| 2016/0315969 A1 | 10/2016 | Goldstein | |
| 2017/0339193 A1* | 11/2017 | Goldstein | H04L 63/08 |
| 2021/0092123 A1 | 3/2021 | Zahed | |
| 2021/0152606 A1* | 5/2021 | Goldstein | H04L 61/304 |

OTHER PUBLICATIONS

Nguyen, Tuan Anh, et al. "Spam Filter Based on Dynamic Sender Policy Framework". 2010 Second International Conference on Knowledge and Systems Engineering, IEEE, Piscataway, New Jersey, United States of America. Oct. 7, 2010. 5 pages.

Extended European Search Report and Search Opinion issued on European Patent Application No. 20188506.8 dated Oct. 23, 2020, 9 pages.

Non-Final Rejection issued on U.S. Appl. No. 16/582,196, dated Feb. 28, 2022. 20 pages.

* cited by examiner

FIG. 2

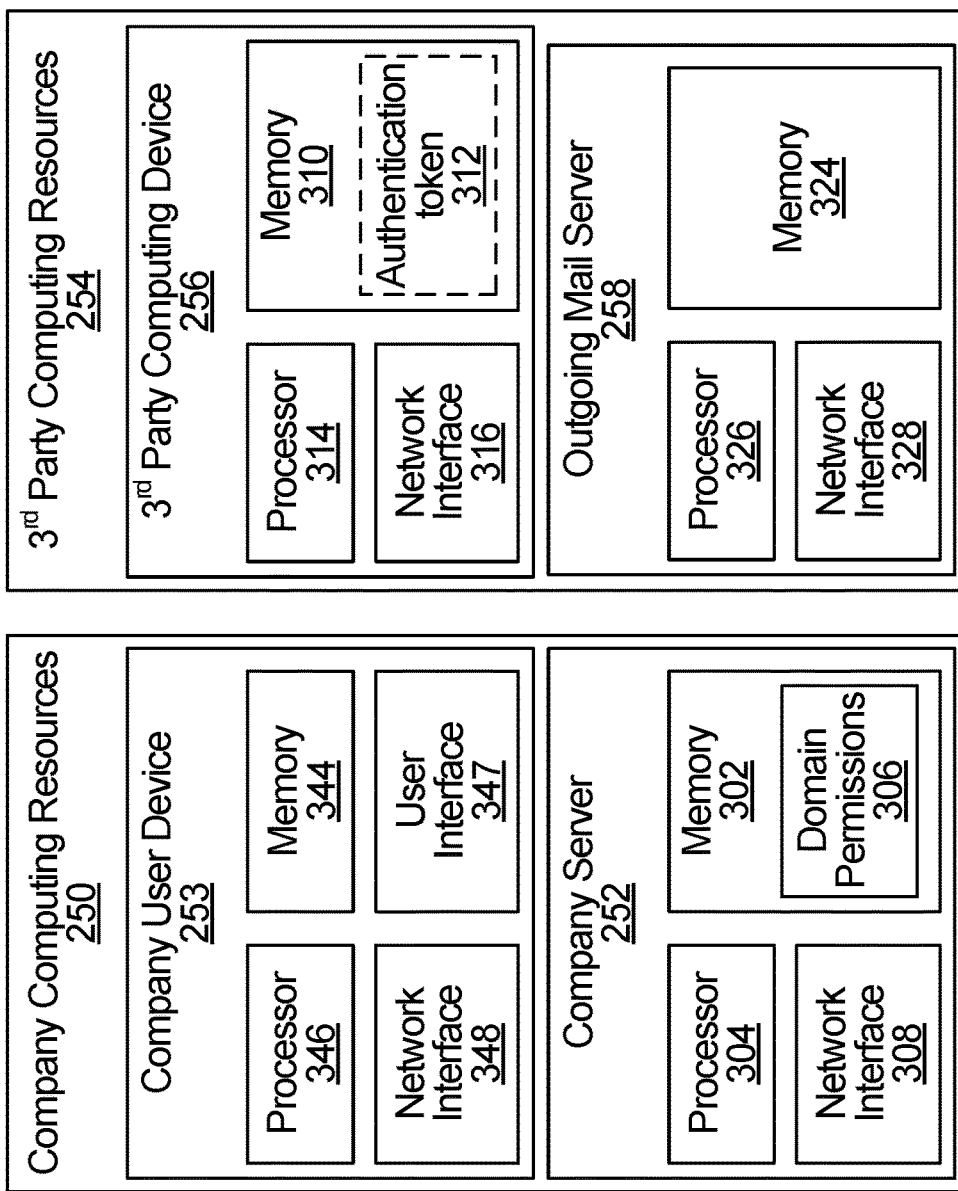

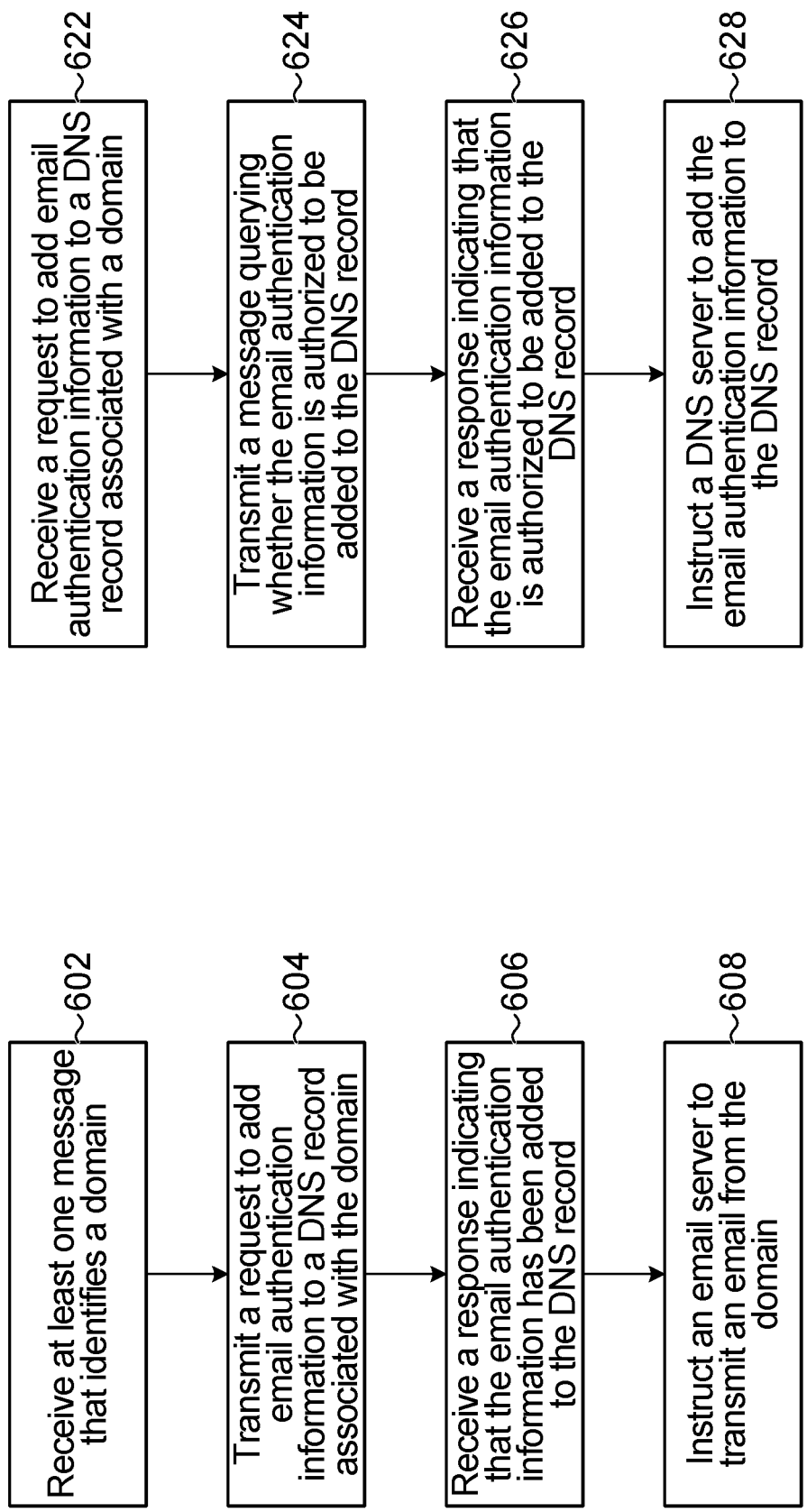

SYSTEMS AND METHODS FOR FACILITATING AUTHENTICATION OF EMAILS SENT BY 3$^{rd}$ PARTIES

FIELD

The present application relates to email security.

BACKGROUND

A company may own or exclusively use a particular domain, e.g. domain.com. As used herein, 'domain' encompasses subdomains. A domain may have one or more email addresses associated with it, e.g. sales@domain.com, info@domain.com, etc. The term "company" is used herein as a generic term that refers to a business of any size. For example, a company may be a large corporation, a small or medium sized business, or a single merchant, e.g. a merchant that sells a product on an e-commerce platform.

The company may send emails, and an email authentication method may be used to authenticate emails received from the company's domain. Examples of email authentication methods include Sender Policy Framework (SPF) and DomainKeys Identified Mail (DKIM).

If SPF is used, then the company publishes an SPF record in the company's Domain Name System (DNS) record associated with the company's domain. The SPF record is stored on a DNS server. The SPF record lists the servers that are authorized to send emails from the company's domain. For example, the SPF record would typically list the IP address(es) or hostname(s) of the server(s) used by the company to send out emails. When an email recipient receives an email from the domain, the recipient performs email authentication as follows: the recipient queries the DNS server for the company's DNS record and checks that the IP address (or hostname) from which the email message was sent matches an IP address (or hostname) that has been authorized in the company SPF record. If a match is found, the check passes.

If DKIM is used, then the company digitally signs a portion of the outgoing mail (e.g. at least the "From" field). For example, information including the "From" field may be hashed to generate a hash value, and then the hash value encrypted with a private key to generate a digital signature. The digital signature is then sent with the email, and the corresponding public key is published on the company's DNS record associated with the company's domain. When an email recipient receives the email, the recipient performs email authentication by verifying the digital signature, e.g. as follows: the recipient queries the DNS record associated with the company's domain and retrieves the public key. The public key is used to decrypt the digital signature and thereby obtain a first hash value. The recipient then uses the received email to generate a second hash value, which is generated in the same way as the hash value that was generated by the sender. The recipient then verifies that the first hash value equals the second hash value.

The company may also use a Domain-based Message Authentication, Reporting and Conformance (DMARC) reporting system that utilizes SPF and/or DKIM authentication, whereby email recipients compile and send a report that includes information on which received emails fail authentication.

Sometimes a company may wish to authorize another business to send emails on behalf of the company's domain. The business authorized to send emails on behalf of the company's domain will be referred to as a "3$^{rd}$ party". The 3$^{rd}$ party operates on a platform, which may be referred to as a 3$^{rd}$ party platform. The emails are sent by the 3$^{rd}$ party, but the "From" portion of the email header is populated with the company's email address/domain. (e.g. sales@domain.com).

If not properly configured, when a 3$^{rd}$ party sends an initial email on behalf of the company's domain, email authentication typically fails. In the case of SPF checks, the IP address or hostname of the 3$^{rd}$ party's outgoing email server is not listed in the company's SPF record for the company's domain. In the case of DKIM, the email is signed with the private key of the 3$^{rd}$ party, but the 3$^{rd}$ party's corresponding public key is not stored in the company's DNS record associated with the company domain. If the company even has a public key stored in the company's DNS record, it corresponds to the private key used by the company (it is not a public key corresponding to the private key used by the 3$^{rd}$ party), and so signature verification will fail.

The problem may be avoided by simply not using SPF or DKIM authentication. However, as these or other email authentication methods help in the prevention of email spoofing, it is desired to implement one of these protocols to enhance email security.

SUMMARY

Computer-implemented methods and systems are disclosed that, in some embodiments, enable email authentication (e.g. SPF record checks and/or DKIM verification) for emails that are sent by a 3$^{rd}$ party on behalf of a company's domain. In some embodiments, the systems and methods enable email authentication information of the 3$^{rd}$ party, such as SPF and/or DKIM information of the 3$^{rd}$ party, to be added to the DNS record associated with the company's domain. Thus, it may be possible for SPF and/or DKIM authentication protocols to be successfully used when the 3$^{rd}$ party sends emails on behalf of the company's domain. The embodiments described are not limited to use with SPF and/or DKIM. More generally, the embodiments described apply to any email authentication protocol in which email authentication information of a 3$^{rd}$ party is to be added to the DNS record associated with a company's domain.

In some embodiments, a trusted entity is enlisted to communicate with the 3$^{rd}$ party and the company. The trusted entity has the proper permissions to request changes in the DNS records of the company. The trusted entity receives the request from the 3$^{rd}$ party to add email authentication information to the DNS record associated with the company's domain. The trusted entity confirms that the 3$^{rd}$ party is authorized by the company, and if so then adds the information to the DNS record associated with the company's domain.

In some embodiments, the methods may be associated with e-commerce or an e-commerce platform. As one example, a 3$^{rd}$ party may send promotional and marketing materials or send order confirmations and updates on behalf of a merchant on the e-commerce platform. In some embodiments, the e-commerce platform may act as the trusted entity or host the trusted entity. In some embodiments, the e-commerce platform may itself be the 3$^{rd}$ party, e.g. if the e-commerce platform sends emails on behalf of merchants on the platform.

In one embodiment, a computer-implemented method is provided that includes receiving at least one message that identifies a domain. The method further includes transmitting, to a trusted entity computing device, a request to add email authentication information to a DNS record associated with the domain. The request includes: (i) the email authentication information and (ii) an indication of the domain. The method may optionally further include receiving a response from the trusted entity computing device. The response indicates that the email authentication information has been added to the DNS record associated with the domain. The method may optionally further include: subsequent to receiving the response, instructing an email server to transmit an email from the domain. A system may be provided to perform the method. The system may include a processor and a memory, where the processor causes the method steps to be executed and the memory stores the relevant information (e.g. the identification of the domain).

In another embodiment, a computer-implemented method is provided that includes receiving a request to add email authentication information to a DNS record associated with a domain. The request includes: (i) the email authentication information and (ii) an indication of the domain. The method further includes transmitting a message to a computing device used by an entity associated with the domain. The message queries whether the email authentication information is authorized to be added to the DNS record associated with the domain. The method further includes receiving a response from the computing device. The response indicates that the email authentication information is authorized to be added to the DNS record associated with the domain. The method may optionally further include: subsequent to receiving the response, instructing a DNS server to add the email authentication information to the DNS record associated with the domain. A system may be provided to perform the method. The system may include a processor and a memory, where the processor causes the method steps to be executed and the memory stores the relevant information (e.g. the email authentication information and the indication of the domain).

BRIEF DESCRIPTION OF THE DRAWINGS

Embodiments will be described, by way of example only, with reference to the accompanying figures wherein:

FIG. 2 is an example of a home page of an administrator, according to one embodiment;

FIGS. 4 to 8 illustrate components of FIG. 3 in greater detail;

FIGS. 15 and 16 each illustrate a respective computer-implemented method, according to one embodiment.

DETAILED DESCRIPTION

For illustrative purposes, specific example embodiments will now be explained in greater detail below in conjunction with the figures.

Example e-Commerce Platform

In some embodiments, the methods disclosed herein may be performed in relation to an e-commerce platform. Therefore, an example of an e-commerce platform will be described.

Figure 1:
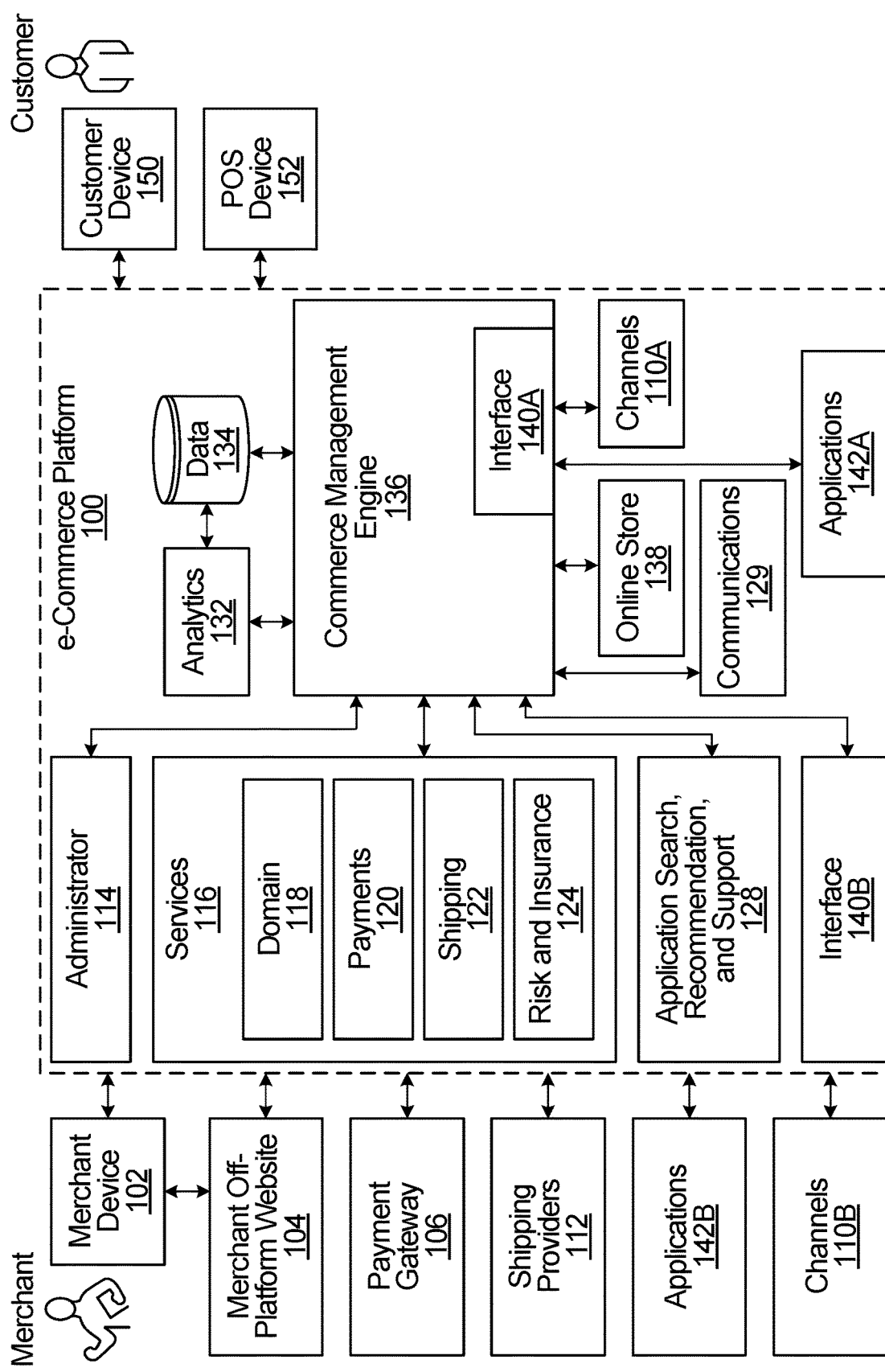
FIG. 1 is a block diagram of an e-commerce platform, according to one embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
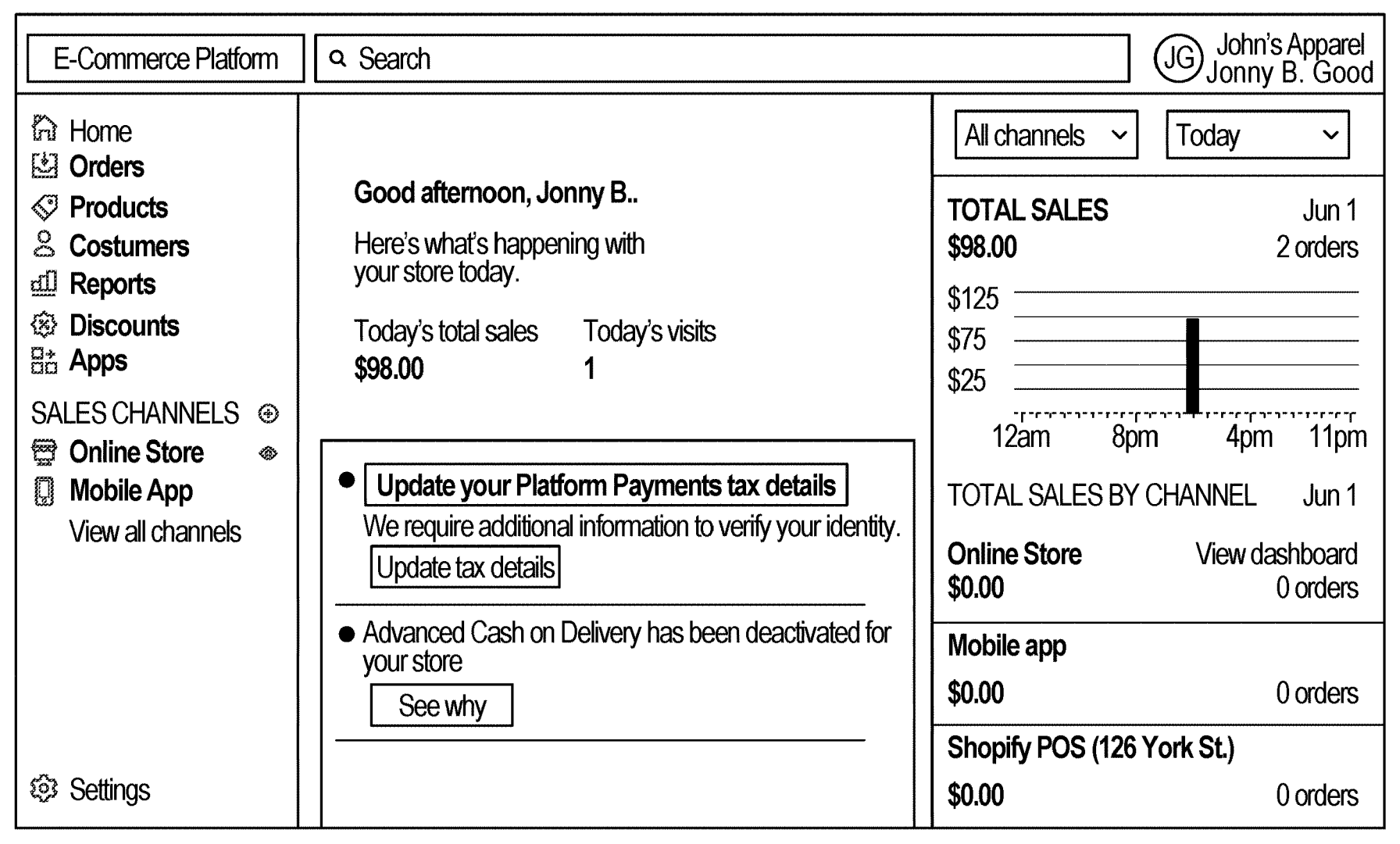

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Emails Sent by $3^{rd}$ Parties on Behalf of a Company's Domain

In some embodiments, the merchant may have a company domain (e.g. domain.com). One or more email addresses may be associated with the company domain, e.g. sales@domain.com. The merchant may enlist a $3^{rd}$ party to send emails on behalf of the company domain. In some embodiments, the $3^{rd}$ party may be the e-commerce platform 100 or part of the e-commerce platform 100, e.g. an outgoing e-mail server in the e-commerce platform 100 that sends emails on behalf of the merchant's company domain. In other embodiments, the $3^{rd}$ party may be an application (e.g. application 142A or 142B) that is executed on the e-commerce platform 100, e.g. an application that sends marketing emails on behalf of the merchant's company domain. In some embodiments, the 3$^{rd}$ party may be another service provider that is not even associated with the e-commerce platform 100.

Systems and methods for securing emails sent by the 3$^{rd}$ party on behalf of the company are described below. However, although the embodiments described below may be implemented in association with an e-commerce platform (e.g. e-commerce platform 100, as in FIG. 1), the embodiments described below are not limited to implementation in an e-commerce platform or even in association with e-commerce. Rather, the embodiments described below may be implemented in any system in which there is a relationship between a company and a 3$^{rd}$ party, and where it is desired that the 3$^{rd}$ party be permitted to send emails on behalf of the company. Therefore, the remaining explanation will not be tied to an implementation in an e-commerce platform.

Securing Emails Sent by a 3$^{rd}$ Party on Behalf of a Company's Domain

Figure 3:
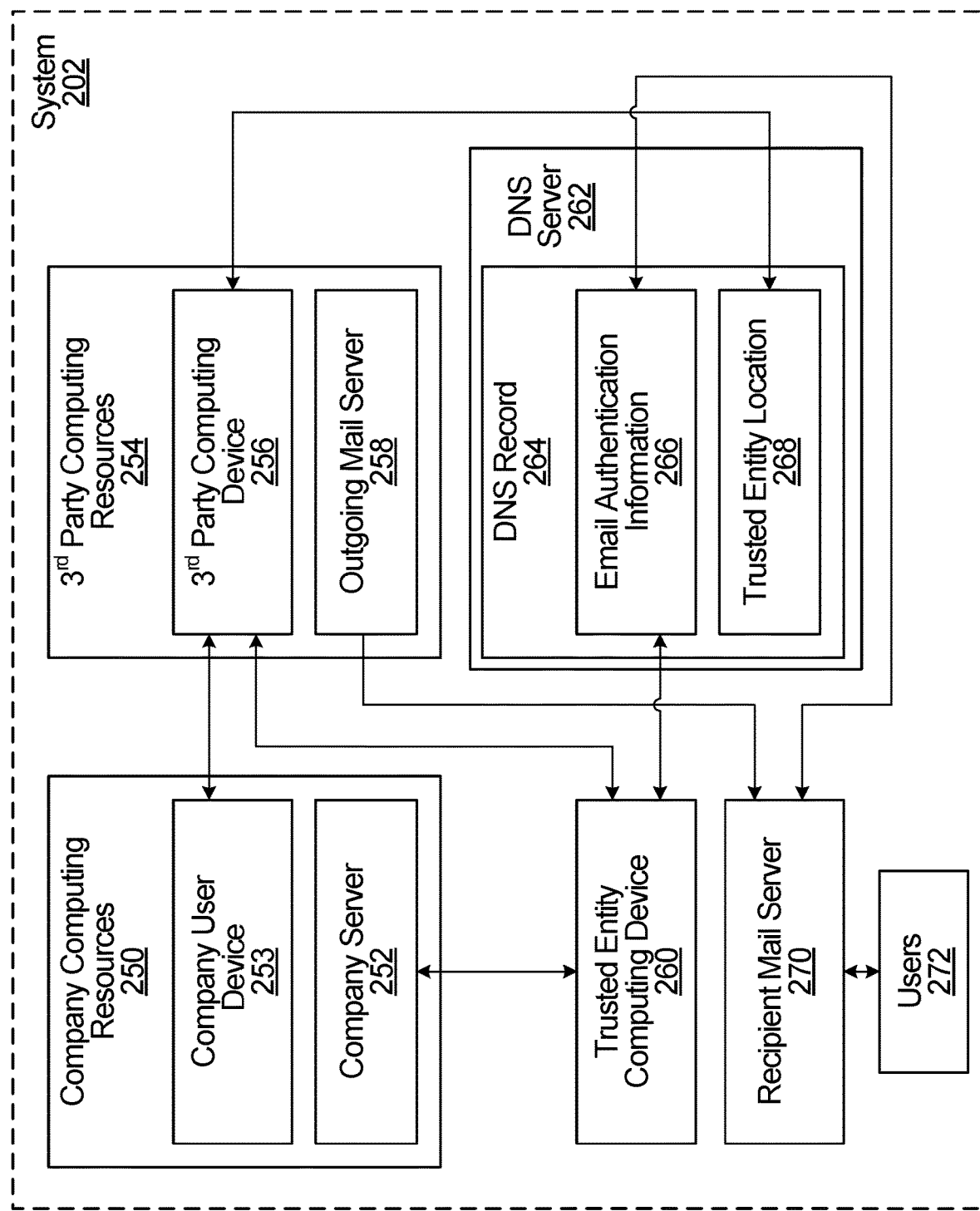
FIG. 3 illustrates a system for securing emails send by a $3^{rd}$ party on behalf of a company's domain, according to one embodiment.

FIG. 3 illustrates a system 202 for securing emails send by a 3$^{rd}$ party on behalf of a company's domain, according to one embodiment. The system 202 includes company computing resources 250 that the company has at its disposal. The company computing resources 250 include a company server 252 and a company user device 253. The company user device 253 is a device used by a user of the company, e.g. a laptop, desktop computer, tablet, or mobile device, etc., depending upon the implementation. In some embodiments, some or all of the company computing resources 250 may be part of an e-commerce platform. For example, the company server 252 may be a server on an e-commerce platform, and which is used for executing operations for or on behalf of the company. The server on the e-commerce platform may also execute operations for or on behalf of other companies using the e-commerce platform. In some embodiments, the company user device 253 may be a merchant device that communicates with the e-commerce platform hosting the server 252. More generally, the company computing resources 250 do not need to have any association with an e-commerce platform.

The system 202 further includes 3$^{rd}$ party computing resources 254 that the 3$^{rd}$ party has at its disposal. The 3$^{rd}$ party computing resources 254 are part of a platform that includes a 3$^{rd}$ party computing device 256. For example, the 3$^{rd}$ party computing device 256 may be a server, personal computer, or mobile device, etc., depending upon the implementation. The 3$^{rd}$ party computing resources 254 also include an outgoing mail server 258. Outgoing mail server 258 is a specific computing device at the disposal of the 3$^{rd}$ party used to transmit email messages to recipient mail servers, such as to recipient mail server 270. Email messages may have attached photos, videos, documents, and/or other files. The outgoing mail server 258 is used by the 3$^{rd}$ party, but it may not necessarily be owned by the 3$^{rd}$ party. In some embodiments, the 3$^{rd}$ party computing resources 254 could be part of an e-commerce platform, e.g. if an e-commerce platform acts as the 3$^{rd}$ party sending emails on behalf of a company.

The system 202 further includes a DNS server 262. The DNS server 262 is a public server that, among other things, stores a DNS record 264 associated with the company's domain. The DNS record 264 records the information discussed below, e.g. the location of trusted entities, email authentication information such as an SPF record and/or DKIM public keys, etc. The DNS record 264 may be stored as one or multiple files on the DNS server 262.

Stored in the DNS record 264 is email authentication information 266. The email authentication information 266 includes information that is to be used by email recipients to authenticate emails received from the company's domain. The email authentication information 266 therefore includes record entries (e.g. TXT files) pertaining to email security, and may include information such as: domains associated with the company computing resources 250, and/or IP addresses (or hostname(s)) which may be used for SPF verification, and/or public keys used for DKIM verification.

The system 202 further includes a trusted entity computing device 260. The trusted entity computing device 260 is a computing device that is trusted by the company computing resources 250. As discussed in detail below, the trusted entity computing device 260 has the capability and the permission to modify information stored in the DNS record 264 associated with the company's domain. For example, the trusted entity computing device 260 may instruct changes to the email authentication information 266 stored within DNS record 264, e.g. by transmitting a message to the DNS server 262 requesting the changes. In some embodiments, the trusted entity computing device 260 may be independent of the company, whereas in other embodiments the trusted entity computing device 260 may be associated with the company (e.g. hosted by the company computing resources 250). In some embodiments, the trusted entity computing device 260 may be part of an e-commerce platform.

The public domain(s) and/or IP address(es) of the trusted entity computing device 260 are stored in a trusted entity location 268 within the DNS record 264. Other computing devices may query the DNS server 262 to obtain the information stored in the trusted entity location 268 of the DNS record 264, and then use this location information to send a message to the trusted entity computing device 260. For example, trusted entity location 268 may be a TXT record that stores the IP address of trusted entity computing device 260. 3$^{rd}$ party computing device 256 may request a copy of the TXT record from the DNS server 262 and read the TXT record to obtain the network location of the trusted entity computing device 260. In some embodiments, the TXT record is stored using an easily identifiable label or standardized format, and as part of the domain's set of records, so that it may be more easily queried.

The system 202 further includes a recipient mail server 270, which is an example of a server that may receive email messages from another outgoing mail server, such as an email sent from the 3$^{rd}$ party's outgoing mail server 258. The recipient mail server 270 is able to communicate with the DNS server 262 and access the email authentication information 266 stored within the DNS record 264 to authenticate received emails. End users 272 access the emails received by the recipient mail server 270 as they are processed and delivered to their email inboxes.

In operation, the company authorizes the 3$^{rd}$ party to send emails on behalf of the company's domain. For example, a company employee or merchant may use the company user device 253 to transmit, to the 3$^{rd}$ party computing device 256, an indication of the company domain and/or email addresses associated with the company domain to be used by the 3$^{rd}$ party. The 3$^{rd}$ party then sends emails on behalf of that company's domain. However, in the absence of further intervention, the following problem may occur. The recipient mail server 270 receives an email sent by the 3$^{rd}$ party on behalf of the company's domain. As part of performing checks against an email authentication protocol, such as SPF or DKIM, the recipient mail server 270 checks the DNS record 264 associated with the company's domain in order to obtain the relevant authentication information stored in email authentication information 266. For example, if SPF authentication is performed by the recipient mail server 270, then the relevant authentication information is the SPF record associated with the company's domain and that is stored as part of email authentication information 266. As another example, if DKIM authentication is performed by the recipient mail server 270, then the relevant authentication information is the DKIM public key stored in email authentication information 266. If any other email authentication methods are instead or additionally implemented, recipient mail server 270 will proceed to perform the relevant authentication checks using the email authentication information 266. However, the $3^{rd}$ party's authentication information will not be included in the email authentication information 266 associated with the company's domain. For example, the IP address of the outgoing mail server 258 used by the $3^{rd}$ party will not be in the SPF record stored in the email authentication information 266. As another example, the DKIM public key corresponding to the private key used by the $3^{rd}$ party's outgoing mail server 258 would not be included in the email authentication information 266 associated with the company's domain. Thus, the email authentication performed by the recipient mail server 270 would typically fail.

To address this problem, and as explained in detail below, in some embodiments the $3^{rd}$ party computing device 256 requests that the $3^{rd}$ party's email authentication information (e.g. IP address of outgoing mail server 258 and/or DKIM public key) be added to the email authentication information 266 stored in the DNS record 264 associated with the company's domain. However, the $3^{rd}$ party is not trusted and does not have access to directly modify the email authentication information 266 stored in the DNS record 264 associated with the company's domain. Therefore, the $3^{rd}$ party's request is sent to and acted upon by the trusted entity computing device 260. The trusted entity computing device 260 first verifies that the $3^{rd}$ party is authorized to send emails on behalf of the company's domain. The verification acts as a verification of whether the $3^{rd}$ party's email authentication information is authorized to be added to the email authentication information 266 of the DNS record 264 associated with the company's domain. If authorization is verified, then the $3^{rd}$ party's email authentication information is added to the email authentication information 266 of the DNS record 264 associated with the company's domain. A subsequent authentication check performed by the recipient mail server 270 should return successful.

FIG. 4 illustrates the company computing resources 250 in more detail, according to one embodiment. As mentioned above, the company computing resources 250 include a company user device 253 and a company server 252. The company user device 253 is a computing device used by a human user in the company. For example, the company user device 253 may be a personal computer, laptop, mobile device, etc., depending upon the implementation. The company user device 253 includes a processor 346 for performing or controlling the operations of the company user device 253, and an associated memory 344. The processor 346 may be implemented by one or more processors that execute instructions stored in the memory 344. Alternatively, some or all of the processor 346 may be implemented using dedicated circuitry, such as an application specific integrated circuit (ASIC), a graphics processing unit (GPU), or a programmed field programmable gate array (FPGA). The company user device 253 further includes a network interface 348 to perform communication (transmit/receive) over a network, e.g. to communicate with the $3^{rd}$ party computing device 256. The structure of the network interface 348 will depend on how the company user device 253 interfaces with the network. For example, if the company user device 253 is a mobile phone or tablet, the network interface 348 may comprise a transmitter/receiver with an antenna to send and receive wireless transmissions over the network. If the company user device 253 is a personal computer connected to the network with a network cable, the network interface 348 may comprise a network interface card (NIC), and/or a computer port (e.g. a physical outlet to which a plug or cable connects), and/or a network socket, etc. The company user device 253 further includes a user interface 347 to allow for a human user to interface with the company user device 253. For example, the user interface 347 may include a display screen (which may be a touch screen) and/or a keyboard and/or a mouse.

The company server 252 includes a processor 304 for performing or controlling the operations of company server 252, and an associated memory 302. The processor 304 may be implemented by one or more processors that execute instructions stored in the memory 302. Alternatively, some or all of the processor 304 may be implemented using dedicated circuitry, such as an FPGA, GPU, or ASIC. The memory 302 of company server 252 may store one or more files that list domains owned by the company, possibly including associated domains in use by $3^{rd}$ parties on behalf of the company. These files are stored as domain permissions 306. The company server 252 further includes a network interface 308 to perform communication (transmit/receive) over a network, e.g. to communicate with the trusted entity computing device 260. The structure of the network interface 308 is implementation specific. For example, in some implementations the network interface 308 may comprise a NIC, and/or a computer port (e.g. a physical outlet to which a plug or cable connects), and/or a network socket, etc.

FIG. 5 illustrates the $3^{rd}$ party computing resources 254 in greater detail, according to one embodiment. As mentioned above, the $3^{rd}$ party computing resources 254 include a $3^{rd}$ party computing device 256 and an outgoing mail server 258. The $3^{rd}$ party computing device 256 includes a processor 314 for performing or controlling the operations of the $3^{rd}$ party computing device 256, and an associated memory 310. The processor 314 may be implemented by one or more processors that execute instructions stored in the memory 310. Alternatively, some or all of the processor 314 may be implemented using dedicated circuitry, such as an FPGA, GPU, or ASIC. In one implementation, the memory 310 may optionally include an authentication token 312, which is used in the manner explain later. The $3^{rd}$ party computing device 256 further includes a network interface 316 to perform communication (transmit/receive) over a network, e.g. to communicate with the trusted entity computing device 260. The structure of the network interface 316 is implementation specific. For example, in some implementations the network interface 316 may comprise a NIC, and/or a computer port (e.g. a physical outlet to which a plug or cable connects), and/or a network socket, etc. The outgoing mail server 258 includes a processor 326 for performing or controlling the operations of the outgoing mail server 258, and an associated memory 324. The processor 326 may be implemented by one or more processors that execute instructions stored in the memory 324. Alternatively, some or all of the processor 326 may be implemented using dedicated circuitry, such as an FPGA, GPU, or ASIC. The outgoing mail server 258 further includes a network interface 328 to perform communication (transmit/receive) over a network, e.g. to transmit outgoing email messages over the network. The structure of the network interface 328 is implementation specific. For example, in some implementations the network interface 328 may comprise a NIC, and/or a computer port (e.g. a physical outlet to which a plug or cable connects), and/or a network socket, etc.

FIG. 6 illustrates the trusted entity computing device 260 in greater detail, according to one embodiment. The trusted entity computing device 260 includes a processor 320 for performing or controlling the operations of the trusted entity computing device 260, and an associated memory 318. The processor 320 may be implemented by one or more processors that execute instructions stored in the memory 318. Alternatively, some or all of the processor 320 may be implemented using dedicated circuitry, such as an FPGA, GPU, or ASIC. The trusted entity computing device 260 further includes a network interface 322 to perform communication (transmit/receive) over a network, e.g. to communicate with the $3^{rd}$ party computing device 256, the company server 252, and the DNS server 262 in the manner explained herein. The structure of the network interface 322 is implementation specific. For example, in some implementations the network interface 322 may comprise a NIC, and/or a computer port (e.g. a physical outlet to which a plug or cable connects), and/or a network socket, etc. In some embodiments, the trusted entity computing device 260 may be implemented by a server or other computing node/device, in which case the processor 320 may also be used for performing other operations not related to the trusted entity.

Figure 7:
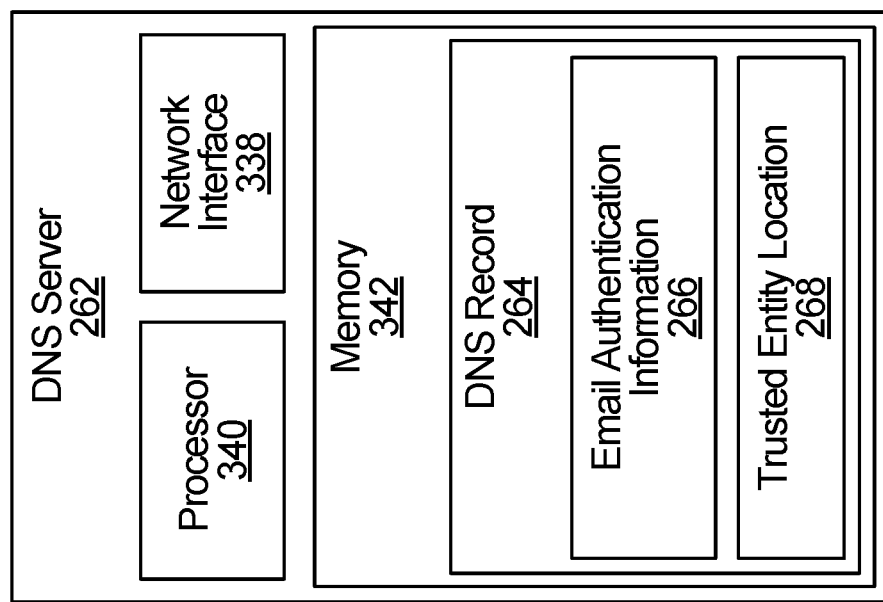

FIG. 7 illustrates the DNS server 262 in greater detail, according to one embodiment. The DNS server 262 includes a processor 340 for performing or controlling the operations of the DNS server 262, and an associated memory 342. The processor 340 may be implemented by one or more processors that execute instructions stored in the memory 342. Alternatively, some or all of the processor 340 may be implemented using dedicated circuitry, such as an FPGA, GPU, or ASIC. The memory 342 stores the DNS record 264 associated with the company's domain. The DNS record 264 contains email authentication information 266 used by email recipients to authenticate emails received from the company's domain. The DNS record 264 further stores the network location of the trusted entity computing device 260 in trusted entity location 268. The DNS server 262 further includes a network interface 338 to perform communication (transmit/receive) over a network, e.g. to receive requests from and send information to other devices. For example, the DNS server 262 may use the network interface 338 to communicate with a recipient email server, such as recipient mail server 270, in order to provide the recipient email server with authentication information stored in email authentication information 266 that is required to authenticate an email sent from the company's domain. The structure of the network interface 338 is implementation specific. For example, in some implementations the network interface 338 may comprise a NIC, and/or a computer port (e.g. a physical outlet to which a plug or cable connects), and/or a network socket, etc.

Figure 8:
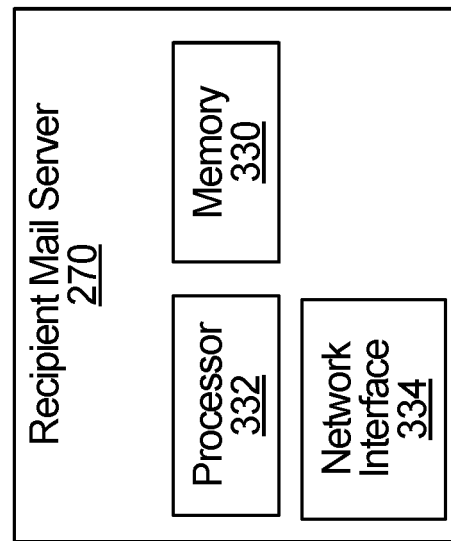

FIG. 8 illustrates the recipient mail server 270 in greater detail, according to one embodiment. The recipient mail server 270 includes a processor 332 for performing or controlling the operations of the recipient mail server 270, and an associated memory 330. The processor 332 may be implemented by one or more processors that execute instructions stored in the memory 330. Alternatively, some or all of the processor 332 may be implemented using dedicated circuitry, such as an FPGA, GPU, or ASIC. The recipient mail server 270 includes a network interface 334 to perform communication (transmit/receive) over a network, e.g. to forward received emails to users 272, to communicate with the DNS server 262 to access email authentication information 266 in order to authenticate emails received from the company's domain, etc. The structure of the network interface 334 is implementation specific. For example, in some implementations the network interface 334 may comprise a NIC, and/or a computer port (e.g. a physical outlet to which a plug or cable connects), and/or a network socket, etc.

Example methods will now be explained.

A $3^{rd}$ party is engaged to send emails on behalf of a company. For example, the $3^{rd}$ party may offer a marketing app that has the ability to automatically send marketing emails to the customers and contacts of the company. The emails are sent by the $3^{rd}$ party, but on behalf of the company's domain. For example, the company's domain may be "domain.com" and the marketing emails sent by the $3^{rd}$ party are from "sales@domain.com".

Figure 9:
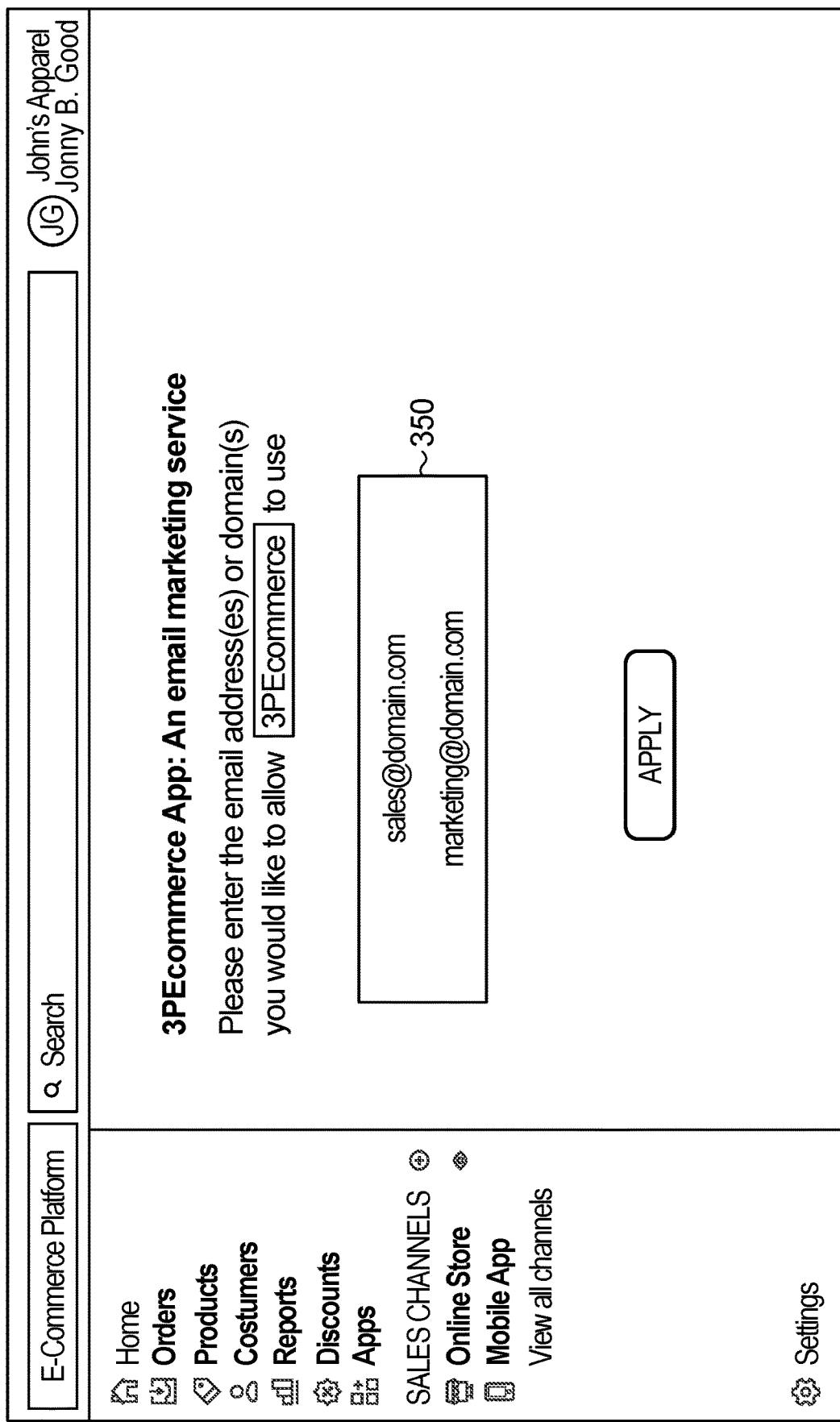
FIGS. 9 and 10 illustrate example user interfaces of a company user device.

In one example, a human at the company uses the user interface 347 of company user device 253 to input the company's domain and/or company email addresses to be used by the $3^{rd}$ party, and the company user device 253 transmits this information to the $3^{rd}$ party computing device 256. FIG. 9 illustrates an example of user interface 347, according to one embodiment. In the embodiment of FIG. 9, a specific example is assumed: the company sells product on an e-commerce platform, and the e-commerce platform supports installation of the $3^{rd}$ party's app such that an administrator (e.g. the merchant) can send information to the $3^{rd}$ party directly through the administrator webpage. FIG. 9 illustrates the administrator webpage with a section displayed that is specific to the $3^{rd}$ party. The $3^{rd}$ party is assumed to be called "3PEcommerce". An input box 350 allows the user to input the company email addresses that are associated with the company domain and that are to be used by the $3^{rd}$ party ("sales@domain.com" and "marketing@domain.com" in the illustrated example). Alternatively, the company domain (e.g. "domain.com") could instead be inserted into the input box 350, e.g. if the $3^{rd}$ party app is to generate the local-part of the emails at their end.

In an alternative to FIG. 9, the $3^{rd}$ party may have no association with an e-commerce platform, and the user interface in FIG. 9 may instead be a website of the $3^{rd}$ party, which the user navigated to on the Internet using the company user device 253.

Once the $3^{rd}$ party has the company domain to be used by the $3^{rd}$ party (e.g. "domain.com" in the illustrated example), the $3^{rd}$ party needs to add email authentication information to the DNS record 264 associated with that company domain so that emails sent from the $3^{rd}$ party on behalf of the company domain can be authenticated by a mail recipient. Examples of email authentication include: the IP address and/or hostname of the server used by the $3^{rd}$ party to send the emails (e.g. for an SPF check), and/or the DKIM public key corresponding to the DKIM private key that will be used by the $3^{rd}$ party to digitally sign the emails.

The $3^{rd}$ party is not trusted and so cannot themselves modify the DNS record 264 associated with the company domain. The $3^{rd}$ party instead needs to send their request to modify the DNS record 264 to a trusted entity that has the ability to modify the DNS record 264. The $3^{rd}$ party computing device 256 therefore first corresponds with the DNS server 262 to request the network location of the trusted entity. The DNS server 262 retrieves the network location of the trusted entity, which in the illustrated embodiment is stored in trusted entity location 268 in the DNS record 264 associated with the company's domain. The retrieved network location of the trusted entity is sent to the 3$^{rd}$ party computing device 256. In the illustrated embodiment, the retrieved network location will be assumed to be the IP address of trusted entity computing device 260.

In an alternative embodiment, the 3$^{rd}$ party may already know the network location of the trusted entity, in which case the 3$^{rd}$ party computing device 256 does not need to correspond with the DNS server 262 to request the network location of the trusted entity. If the 3$^{rd}$ party already has the network location of the trusted entity (e.g. because the 3$^{rd}$ party previously retrieved it from the DNS server 262 and stored the network location in the local memory of the 3$^{rd}$ party), then in some embodiments the 3$^{rd}$ party may need to perform a validation protocol to confirm that the network location of the trusted entity is still valid and has not changed. Examples of validation protocols may include querying the DNS server 262 to confirm the network location of the trusted entity is still correct and/or performing a signature validation on the network location (e.g. a new network location may correspond to a new private/public key pair), etc.

The 3$^{rd}$ party computing device 256 transmits a message to the trusted entity computing device 260. The message includes the authentication information possessed by the 3$^{rd}$ party that the 3$^{rd}$ party wants added to the DNS 264 record associated with the company's domain. Examples of authentication information include: the IP address and/or hostname of the server used by the 3$^{rd}$ party to send emails on behalf of the company's domain, which is to be added to the company's SPF record for the domain; and/or the public key corresponding to the DKIM private key used by the 3$^{rd}$ party to sign the emails sent on behalf of the company's domain.

The trusted entity computing device 260 receives the request from the 3$^{rd}$ party, and in response transmits a message to the company server 252 asking for confirmation that the 3$^{rd}$ party's email authentication information can be added to the DNS record associated with the company's domain. The query may be indirect, e.g. by querying whether the company has authorized the 3$^{rd}$ party to send emails on behalf of the company (the answer to this question is the answer to the question of whether the 3$^{rd}$ party's email authentication information may be added to the DNS record associated with the company's domain). The message may include the domain and/or email addresses that the 3$^{rd}$ party will use. In some embodiments, the message may be digitally signed to authenticate that the message originated from the trusted entity computing device 260.

Figure 10:
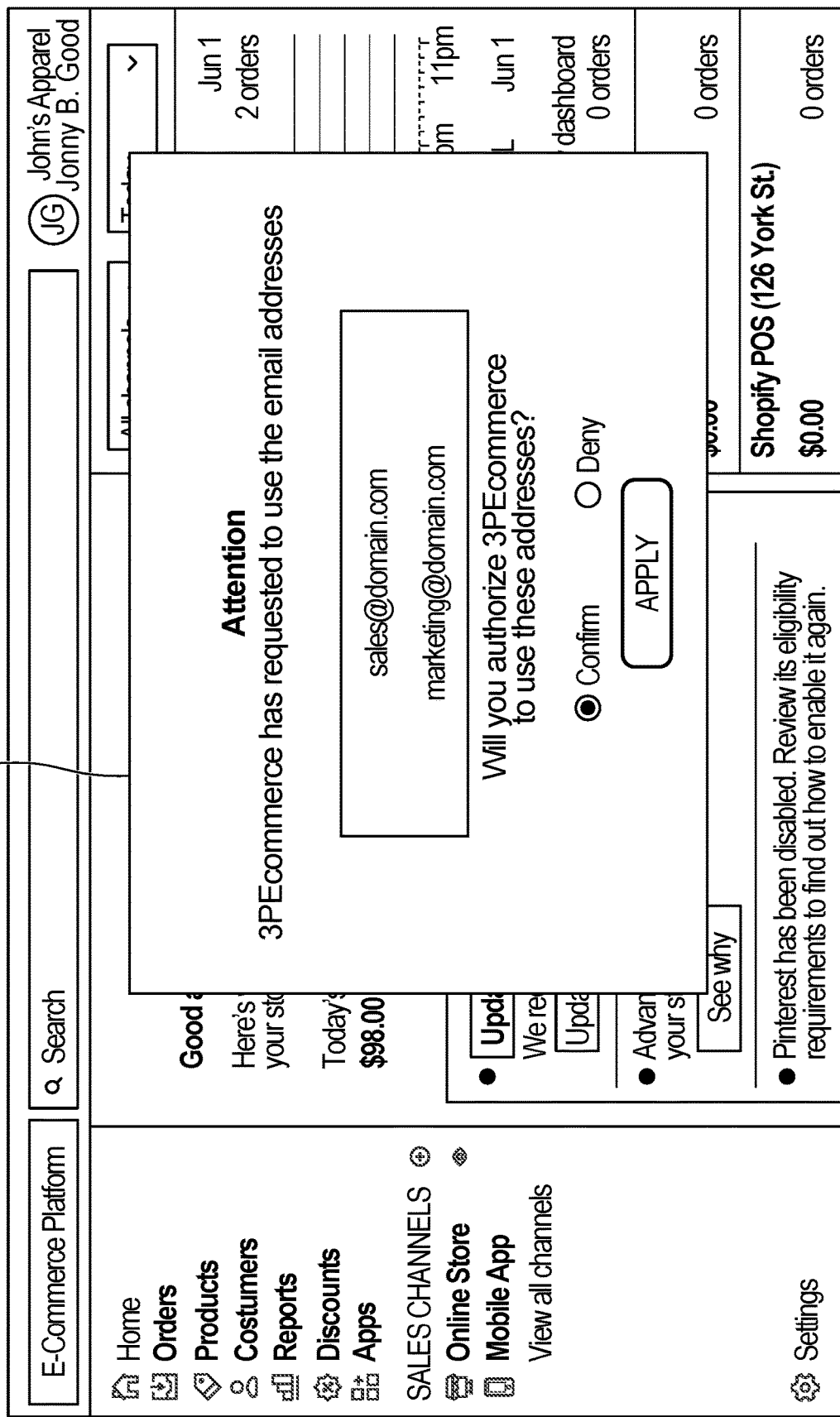

In response, the company server 252 may send a message to the company user device 253 asking for authorization. The reply received from the company user device 253 may then be transmitted from the company server 252 to the trusted entity computing device 260. FIG. 10 illustrates an example of an authorization request that may be presented on the user interface 347 of the company user device 253, according to one embodiment. In the embodiment of FIG. 10, a specific example is assumed: the company sells product on an e-commerce platform, and the authorization request is presented on the administrator webpage. FIG. 10 illustrates a modal window 352 that pops up on the display screen of user interface 347 on the company user device 253. The user confirms that the 3$^{rd}$ party is authorized to send emails on behalf to the company's domain. The user may be asked to confirm the domain ("domain.com") or, as illustrated, perhaps even the specific email addresses of that domain that will be used by the 3$^{rd}$ party ("sales@ domain. com" and "marketing@domain.com" in the illustrated example). If authorization is given, then this is accepted as authorization that the 3$^{rd}$ party's email authentication information can be added to the DNS record associated with the company's domain.

In an alternative implementation (different from FIG. 10), the authorization request may instead be transmitted to the company user device via another route, e.g. in an email to an email address specified by the company, e.g. if the company is not on an e-commerce platform or the e-commerce platform does not support the ability to accommodate authorization requests. The company user may indicate 'accept' using the email (e.g. by clicking a website link in the email or by replying to the email), which results in a message being transmitted to the trusted entity device indicating that authorization is given for the 3$^{rd}$ party's email authentication information to be added to the DNS record associated with the company's domain.

In an alternative embodiment, the company user device 253 may instead provide the 3$^{rd}$ party with a token or other proof of authorization, which is stored by the 3$^{rd}$ party computing device (e.g. authorization token 312), and is then sent directly by the 3$^{rd}$ party computing device 256 to the trusted entity computing device 260, thereby avoiding the need for the trusted entity computing device 260 to explicitly query the company server 252 for authorization.

Assuming authorization is received from the company server 252, then the trusted entity computing device 260 modifies the DNS record 264 associated with the company domain to include the email authentication information received from the 3$^{rd}$ party. The trusted entity computing device 260 is trusted and has permission to modify the DNS record 264 to change/update the email authentication information 266 associated with the company's domain, e.g. simply by the trusted entity computing device 260 sending a request to the DNS server 262. In some embodiments, the request to modify the email authentication information 266 may be digitally signed by the trusted entity computing device 260 to authenticate that the request originated from the trusted entity computing device 260.

Subsequently, when an email sent by the 3$^{rd}$ party on behalf of the company domain is received by an email recipient (e.g. by recipient mail server 270), the email recipient may perform email authentication using the 3$^{rd}$ party's authentication information stored as part of the email authentication information 266 in the DNS record 264 associated with the company's domain. For example, if the email authentication performed by the email recipient includes performing an SPF check, then the SPF check should pass because the IP address (or hostname) for the 3$^{rd}$ party's server is stored in the company's SPF record for that domain. As another example, if the email authentication performed by the email recipient includes performing a DKIM signature verification, then the signature should verify because the 3$^{rd}$ party's corresponding public key is included in and can be retrieved by the email recipient from the company's DNS record for the domain.

Figure 11:
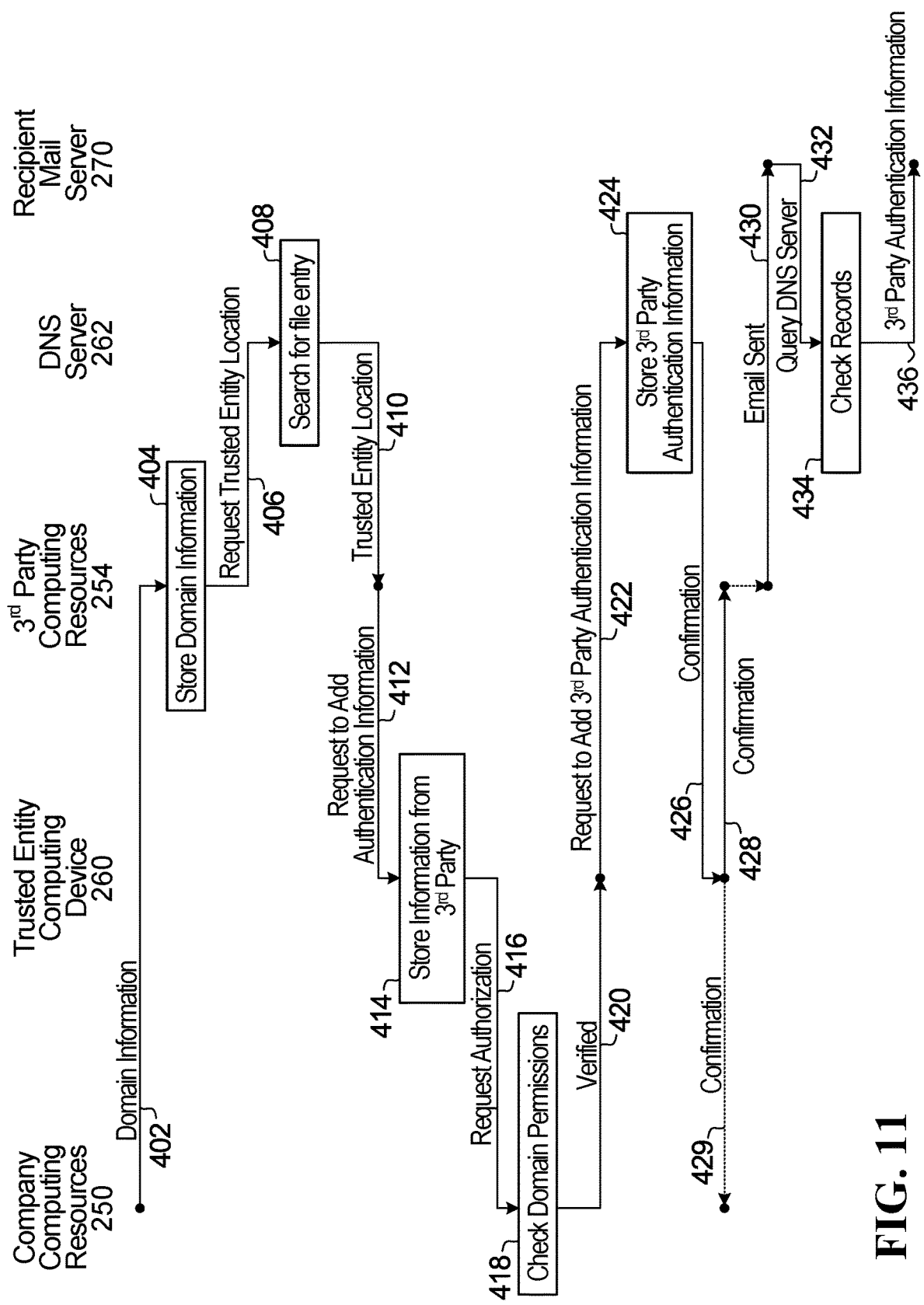
FIGS. 11 and 12 illustrate methods for authenticating email messages sent by a $3^{rd}$ party on behalf of a company's domain, according to various embodiments.

FIG. 11 illustrates a method for authenticating email messages sent by a 3$^{rd}$ party on behalf of a company's domain, according to one embodiment.

At step 402, a computing device of the 3$^{rd}$ party computing resources 254 (e.g. 3$^{rd}$ party computing device 256) receives domain information from the company. The domain information includes at least one company domain to be used by the 3$^{rd}$ party to send emails on behalf of the company. In some embodiments, the domain information may be provided in the form of one or more email addresses of the company domain that are to be used by the 3$^{rd}$ party, but this is not necessary. For example, if the 3$^{rd}$ party is to use the company domain "domain.com", then the domain information may be "domain.com" and/or any email address of the domain (e.g. "sales@domain.com").

In general, the domain information may be received by the 3$^{rd}$ party from the company user device 253, and/or from the company server 252, and/or from any other company computing device or intermediary computing device, and/or as a printed document, and/or orally, and/or in any other manner. In some embodiments, the domain information may be sent to the 3$^{rd}$ party in an automated manner based on a request by the 3$^{rd}$ party, or based an indication originating from a company user's input. FIG. 9 illustrates one example of how a user in the company may supply the domain information to the 3$^{rd}$ party.

At step 404, the 3$^{rd}$ party stores the transmitted domain information in memory, e.g. in memory 310 of 3$^{rd}$ party computing device 256. At step 406, the 3$^{rd}$ party computing device 256 sends a request to the DNS server 262 to retrieve the trusted entity location 268 saved in the DNS record 264 associated with the company domain.

At step 408, the DNS server 262 searches/queries the DNS record 264 for the trusted entity location 268 to obtain the IP address of the trusted entity computing device 260. In some embodiments, it may be necessary for the DNS server 262 to translate the domain or hostname of the trusted entity computing device 260 into the current IP address of the trusted entity computing device 260, and the current IP address of the trusted entity computing device may be stored for future reference (in which case it may need to be validated upon future use in case the IP address has updated or expired).

At step 410, the DNS server 262 returns the IP address of the trusted entity computing device 260 to the 3$^{rd}$ party computing device 256.

At step 412, the 3$^{rd}$ party computing device 256 utilizes the received IP address to send a message to the trusted entity computing device 260. The message includes the following: (1) an indication of the company's domain; (2) a request asking that the trusted entity computing device 260 modify the company's DNS record to include 3$^{rd}$ party email authentication information needed by a recipient mail server to verify email messages sent by the 3$^{rd}$ party on behalf of the company's domain; and (3) the relevant email authentication information. For example, if SPF is being used then the relevant IP address(es) or hostname(s) of the 3$^{rd}$ party's outgoing mail server 258 may be sent in the request to the trusted entity computing device 260. If DKIM is being used then the proper public authentication key(s) and selector names with the fully qualified domain name (FQDN) may be sent. If another email authentication protocol is instead being used, then the relevant email authentication information for that protocol may be sent to the trusted entity computing device 260. Other domain information may also be sent to the trusted entity computing device 260, such as the company domain and/or the company email address(es) to be used by the 3$^{rd}$ party.

At step 414, the aforementioned information received by the trusted entity computing device 260 from the 3$^{rd}$ party is temporarily stored in memory by the trusted entity computing device 260.

At step 416, the trusted entity computing device 260 transmits a request to the company (e.g. to company server 252) to confirm that the 3$^{rd}$ party is indeed authorized to use the company domain. The request may optionally also include the company domain email addresses to actually be used by the 3$^{rd}$ party, possibly along with a request to authorize use of those specific email addresses, e.g. as is the case in FIG. 10.

At step 418, the company server 252 searches its memory for its domain permissions 306, and cross-references the information in the authorization request received from the trusted entity computing device 260 against a record of what the company has authorized for use by the 3$^{rd}$ party. Alternatively, or additionally, the company server 252 may forward the authorization request to the company user device 253, e.g. like the example in FIG. 10.

Assuming authorization is obtained, at step 420 the company server 252 sends a message to the trusted entity computing device 260 confirming that the 3$^{rd}$ party's authentication information may be written to the DNS record 264 associated with the company's domain. In some embodiments, the authorization message may be encrypted, e.g. using a private key of the company server 252, and decrypted by the trusted entity computing device 260 by using a corresponding public key.

At step 422, the trusted entity computing device 260 sends a request to the DNS server 262 to add the 3$^{rd}$ party's authentication information to the email authentication information 266 within the DNS record 264 associated with the company's domain. In some embodiments, the request may be encrypted and/or digitally signed by the trusted entity computing device 260.

At step 424, the DNS server 262 accesses its memory and stores the 3$^{rd}$ party authentication information in the email authentication information 266. At step 426, the DNS server 262 returns, to the trusted entity computing device 260, confirmation that the information has been added to the DNS record 264. Alternatively, a failure notice may be returned to the trusted entity computing device 260 if for some reason the information could not be added to the DNS record 264. Assuming the information is successfully added to the DNS record 264, at step 428 the trusted entity computing device 260 relays to the 3$^{rd}$ party computing device 256 that the 3$^{rd}$ party's email authentication information has been successfully added to the DNS record 264 associated with the company's domain. The confirmation message may also optionally be sent to the company server 252, as shown at step 429.

The following sequence of steps happen subsequent to steps 402-429, and may be repeated without repeating steps 402-429. At step 430 the 3$^{rd}$ party's outgoing mail server 258 sends an email message on behalf of the company's domain. If DKIM verification is used, the outgoing mail server 258 signs the email using a private key corresponding to the public key added to the DNS record 264 in step 424. The recipient mail server 270 receives the email, and at step 432 the recipient mail server 270 queries the DNS server 262 for the email authentication information needed to authenticate the received email. At step 434, the DNS server 262 checks the DNS record 264 associated with the company's domain and retrieves the relevant authentication information from email authentication information 266. At step 436, the DNS server 262 transmits the relevant email authentication information to the recipient mail server 270, which uses the received email authentication to authenticate the email. If the email authentication involves an SPF check, then the relevant email authentication information is an indication of the IP address(es) or hostname(s) authorized to send an email from the company domain, which includes the IP address (and/or hostname) of the 3$^{rd}$ party's outgoing mail server 258. If the email authentication involves a DKIM verification, then the relevant email authentication information is a public key corresponding to the private key that was used by the $3^{rd}$ party's outgoing mail server 258 to digitally sign the email message.

Figure 12:
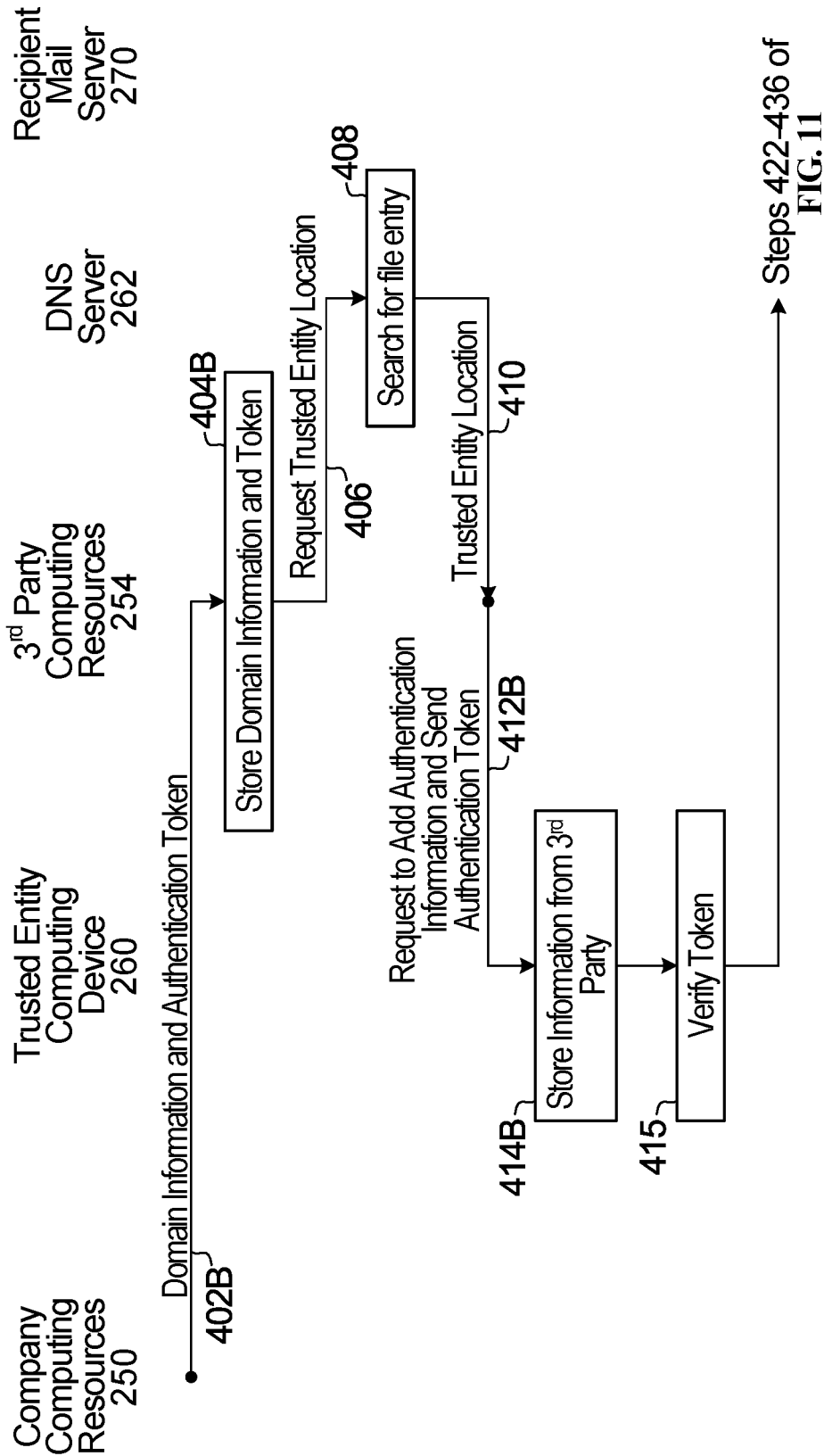

FIG. 12 illustrates a method for authenticating email messages sent by a $3^{rd}$ party on behalf of a company's domain, according to another embodiment. In FIG. 12, the company provides authorization token 312 to the $3^{rd}$ party to hasten validation. The authentication token 312 is not necessarily permanent, but may expire after a certain duration of time.

Steps 402B, 404B, 406, 408, 410, 412B and 414B of FIG. 12 are the same as respective steps 402, 404, 406, 408, 410, 412 and 414 of FIG. 11, with the following modifications. In step 402B, the information received by the $3^{rd}$ party from the company also includes authentication token 312. Authentication token 312 represents a piece of information that can be used by the trusted entity computing device 260 to validate that the company has authorized the $3^{rd}$ party to send emails on behalf of the company's domain, which acts as authorization that the $3^{rd}$ party's email authentication information can be added to the DNS record associated with the company's domain. For example, the authentication token may 312 may be an authorization message digitally signed by the company, and that the trusted entity computing device 260 can verify using a public key corresponding to the private key used by the company to sign the message. The authentication token 312 is also stored at step 404B, and the authentication token 312 is also transmitted from the $3^{rd}$ party to the trusted entity computing device 260 at step 412B, and stored by the trusted entity computing device 260 at step 414B.

At step 415, the trusted entity computing device 260 validates the authorization token 312. If validation is successful, then steps 416, 418, and 420 of FIG. 11 do not need to be performed. Instead, the method of FIG. 12 continues at step 422. Steps 422 to 436 of FIG. 11 are performed.

Figure 13:
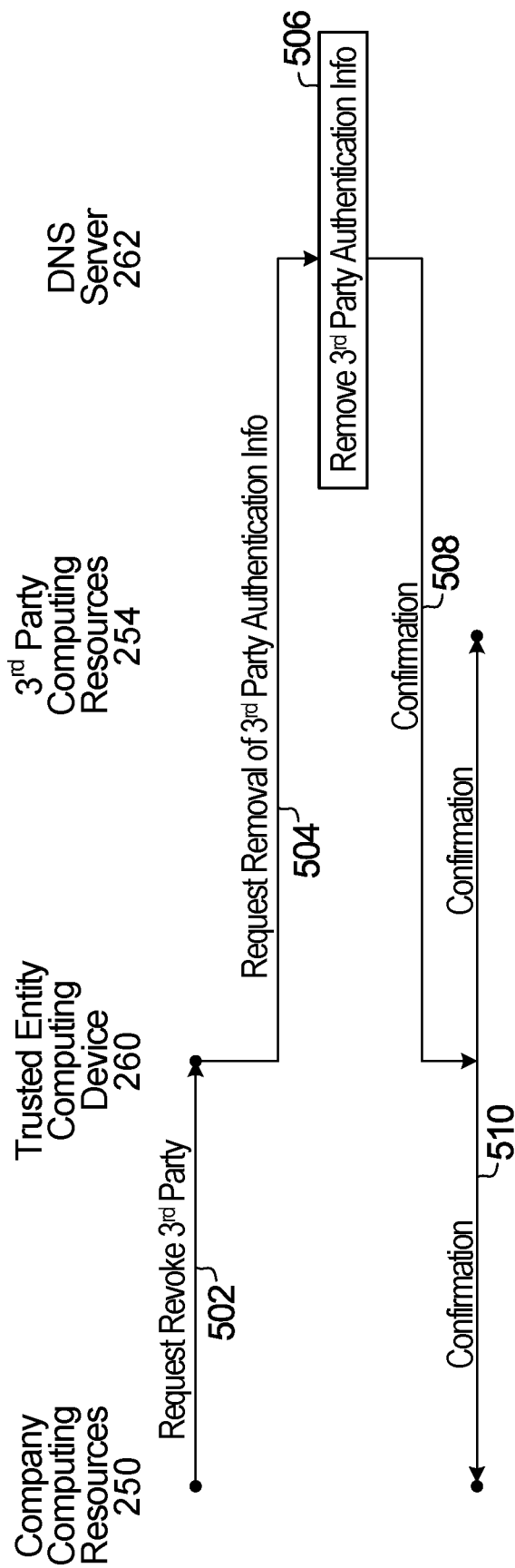
FIGS. 13 and 14 illustrate methods for removing a $3^{rd}$ party's email authentication information from the DNS record, according to various embodiments.

FIG. 13 is a method for removing the $3^{rd}$ party's email authentication information from the DNS record, according to one embodiment. At step 502, a computing device of the company computing resources 250 (e.g. company server 252) transmits a request to the trusted entity computing device 260 to remove the $3^{rd}$ party's email authentication information from the DNS record. For example, the request may be in the form of a request to revoke the $3^{rd}$ party's permission to send emails on behalf of the company's domain. In response to the request, at step 504 the trusted entity device 260 transmits a message to the DNS server 262 requesting that the DNS server 262 remove the $3^{rd}$ party's email authentication information stored as part of the email authentication information 266 in the DNS record 264 associated with the company's domain. At step 506, the email authentication information 266 is edited to remove the $3^{rd}$ party email authentication information (e.g. IP addresses, public keys, domains, email addresses, and/or other authentication information associated with the $3^{rd}$ party). At step 508 the DNS server 262 sends confirmation to the trusted entity computing device 260 that the email authentication information 266 has been modified in the manner requested. At step 510 the confirmation may be passed on to either or both of the company server 252 and the $3^{rd}$ party computing device 256.

In some embodiments, the request sent at step 502 to remove the $3^{rd}$ party's email authentication information may be sent in response to a change in the e-commerce platform, e.g. a deletion of the $3^{rd}$ party's application installed on the e-commerce platform for the company, and/or by an indication originating from a user of the company device.

In an alternative embodiment to FIG. 13, the company may not need to go through the trusted entity computing device 260, but may be able to modify the DNS record directly. For example, the company server 252 may send a message to the DNS server 262 directly requesting that the $3^{rd}$ party email authentication information be removed from the DNS record 264 associated with the company's domain.

In some embodiments, a database may be maintained by the company server 252 that records all relationships the company has with $3^{rd}$ parties. The database may be updated when the company no longer has a relationship with a $3^{rd}$ party. In some embodiments, an update made in the database to remove a relationship with a $3^{rd}$ party may trigger a request to remove that $3^{rd}$ party's email authentication information from the DNS record. The company server 252 may act on the request by directly removing the $3^{rd}$ party's email authentication information from the DNS record, or by going through the trusted entity to have the $3^{rd}$ party's email authentication information removed. In some embodiments, when a $3^{rd}$ party's email authentication information is removed from the DNS record, then that may trigger an update to the database to remove or modify the relationship between the company and that $3^{rd}$ party. In some embodiments, the trusted entity device 260 may store a record of relationships between companies and $3^{rd}$ parties, or a record of which $3^{rd}$ parties are authorized to send emails on behalf of which companies. The record may be updated as $3^{rd}$ party email authentication information is added to or removed from DNS records.

Figure 14:
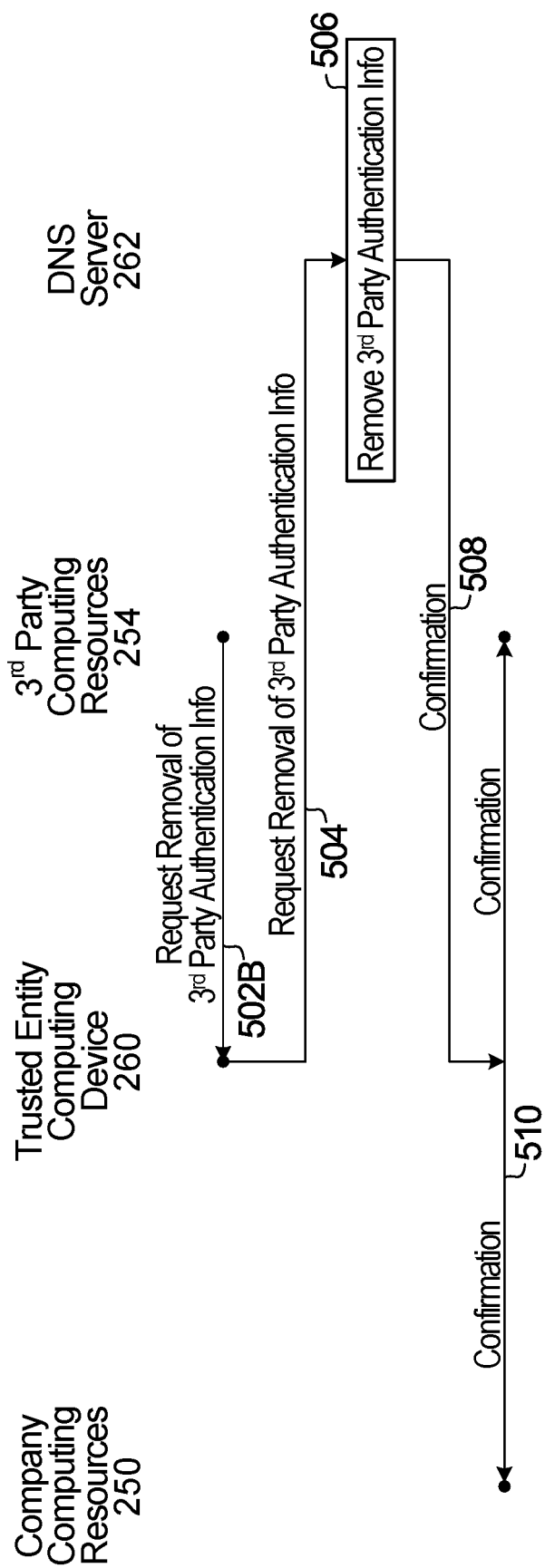

FIG. 14 illustrates a variation of FIG. 13 in which the $3^{rd}$ party seeks to remove their $3^{rd}$ party email authentication information from the DNS record 264 associated with the company's domain, e.g. if the $3^{rd}$ party is no longer sending emails on behalf the company's domain. Step 502B is the same as step 502 of FIG. 13, except in step 502B the request is coming from the $3^{rd}$ party computing device 256, not the company. Steps 504-510 are the same as in FIG. 13.

In some embodiments, the $3^{rd}$ party may wish to modify or update the $3^{rd}$ party's email authentication information stored on the DNS record 264 associated with the company's domain. The permissions granted by the company (e.g. in steps 416-420 of FIG. 11 or via the authentication token 312) may permit the trusted entity computing device 260 to update the email authentication information upon request by the $3^{rd}$ party computing device 256. For example, if the IP address of the outgoing mail server 258 changes and/or the DKIM private key used by the $3^{rd}$ party changes, then the $3^{rd}$ party may send the updated information to the trusted entity computing device 260, which in turn communicates with the DNS server 262 to apply the update to the email authentication information 266 stored in the DNS record 264.

FIG. 15 illustrates a computer-implemented method, according to one embodiment. The method may be performed by a computing device, e.g. a processor such as processor 314 of $3^{rd}$ party computing device 256. In some embodiments, the method may be performed on or by a platform that sends emails on behalf of a domain. For example, the platform may include the $3^{rd}$ party computing resources 254. In some embodiments, the platform may be a $3^{rd}$ party platform not associated with an e-commerce platform, and that sends emails on behalf of merchants or companies. In some embodiments, the platform may be the e-commerce platform, e.g. if the e-commerce platform sends emails on behalf of a merchant or company.

At step 602, at least one message is received. The at least one message identifies a domain. For example, the at least one message may be or include the message transmitted to the 3rd party computing device 256 when "Apply" is selected in FIG. 9, in which case the domain is identified by the domain portion of the email addresses ("domain.com"). However, providing an email address is not necessary. In some embodiments, the identification of the domain in the at least one message may just be the domain itself, and not part of an email address (e.g. the message may be "Please use domain.com"). In some embodiments, the domain is associated with a merchant or a company, and the at least one message is received from a computing device used by the merchant or the company (e.g. the at least one message is received from company user device 253). In some embodiments, the at least one message serves as an indication that emails are to be sent on behalf of the domain.

Another example of the at least one message is the message sent in step 402 of FIG. 11, which is received by 3rd party computing resources 254 from company computing resources 250.

At step 604, a request is transmitted to a trusted entity computing device. In some embodiments, the trusted entity computing device is any computing device that is trusted (e.g. by the company owning or using the domain) to modify email authentication information stored on a DNS record associated with the domain. The request is to add email authentication information to the DNS record associated with the domain. The request includes: (i) the email authentication information and optionally (ii) an indication of the domain. An example of such a request is step 412 of FIG. 11 in which the request is sent from 3rd party computing resources 254 to trusted entity computing device 260.

At step 606, a response is received from the trusted entity computing device. The response indicates that the email authentication information has been added to the DNS record associated with the domain. An example of step 606 is the confirmation sent at step 428 of FIG. 11.

At step 608, subsequent to receiving the response, an email server is instructed to transmit an email from the domain. For example, processor 314 of 3rd party computing device 256 may send the instruction to outgoing mail server 258. Another example of step 608 is the 3rd party computing resources 254 instructing the email sent at step 430 of FIG. 11. Note that step 608 is optional.

In some embodiments, the email authentication information includes an IP address and/or hostname of the email server, e.g. if SPF is being used. In some embodiments, the email authentication information additionally or instead includes a public key corresponding to a private key used by the email server, e.g. if DKIM is being used.

In some embodiments, the method of FIG. 15 further includes: transmitting, to a DNS server, a request for network location information of the trusted entity computing device; and receiving, from the DNS server, the network location information. An example is steps 406 and 410 of FIG. 11. In some embodiments, this network location information is then used to transmit, to the trusted entity computing device, the request to add the email authentication information to the DNS record. In some embodiments, the network location information comprises an IP address of the trusted entity computing device.

In some embodiments, as discussed above, the at least one message may include an email address having the domain. In some embodiments, the domain may be identified in the at least one message by the email address. In some embodiments, instructing the email server to transmit the email from the domain may include instructing the email server to transmit the email from the email address (e.g. the outgoing mail server 258 may be instructed to send the email from "sales@domain.com", which originates from the input in box 350 of FIG. 9). In some embodiments, the domain of the email address is the indication of the domain transmitted to the trusted entity computing device. In some embodiments, the request transmitted to the trusted entity computing device includes the email address.

In some embodiments, the request transmitted to the trusted entity computing device further includes authorization information indicating that the platform is authorized to send the emails of behalf of the domain. An example is the authorization token described in relation to FIG. 12. In some embodiments, the authorization information may be received in the at least one message.

The receiving and transmitting steps described above in relation to FIG. 15 may be performed by a network interface, which is an example of a structure for transmitting and receiving communications over a network. Any instructing step (e.g. step 608) may be performed by a processor that issues an instruction, which is subsequently transmitted over a network interface.

FIG. 16 illustrates a computer-implemented method, according to another embodiment. The method may be performed by a computing device, e.g. a processor such as processor 320 of trusted entity computing device 260.

At step 622, a request is received to add email authentication information to a DNS record associated with a domain. The request includes: (i) the email authentication information and optionally (ii) an indication of the domain. An example of such a request is the request received by the trusted entity computing device 260 at step 412 of FIG. 11. In some embodiments, the request received at step 622 is received from a platform that sends emails on behalf of the domain. As discussed earlier, the platform may or may not be an e-commerce platform.

At step 624, a message is transmitted to a computing device used by an entity associated with the domain. The message queries whether the email authentication information is authorized to be added to the DNS record associated with the domain. An example of an entity associated with the domain is a merchant or company that owns or uses the domain. The computing device may be part of company computing resources 250, e.g. company user device 253. An example of the message is the message sent at step 416 of FIG. 11. Note that if there is an actual question asked in the message, the actual question is implementation specific. For example, the message may directly and explicitly ask "is this party's email authentication information authorized to be added to the DNS record associated with the domain?", or the question may be indirect but still indicative of whether the email authentication information is authorized to be added to the DNS record, e.g. "is this party authorized to use your company domain" or "do you authorize this party to use the 'sales@domain.com' email address" (either of which answered 'yes' would be confirmation that the email authentication information is authorized to be added to the DNS record associated with the domain). Asking an indirect question may be more beneficial because if a human user needs to ultimately give the authorization, the human user may not understand email authentication, but only understand simpler questions relating to whether or not the company is authorized to use the domain or email addresses.

At step 626, a response is received from the computing device. The response indicates that the email authentication information is authorized to be added to the DNS record associated with the domain. An example of the response is that sent in step 420 of FIG. 11.

At step 628, subsequent to receiving the response, a DNS server is instructed to add the email authentication information to the DNS record associated with the domain. An example is the request sent at step 422 of FIG. 11.

In some embodiments, the request received at step 622 includes an email address to be used by the platform to send the emails on behalf of the domain (e.g. the email "sales@domain.com" in FIGS. 9 and 10). In some embodiments, the email address is also included in the message querying whether the email authentication information is authorized to be added to the DNS record, e.g. like in the FIG. 10 example. In some embodiments, the response received at step 626 also indicates that the email address is authorized to be used by the platform to send the emails on behalf of the domain. In some embodiments, the email address included in the request received at step 622 is the indication of the domain in the request.

In some embodiments, the email authentication information includes an IP address and/or hostname of an email server, e.g. if SPF is being used. In some embodiments, the email authentication information additionally or instead includes a public key corresponding to a private key used by an email server, e.g. if DKIM is being used.

In some embodiments, the method of FIG. 16 further includes transmitting, to the DNS server, network location information to be stored in the DNS record associated with the domain. The network location information indicates a location in a network at which the request is to be sent. In some embodiments, the network location information comprises an IP address of a trusted entity computing device.

In some embodiments, the entity associated with the domain is a merchant or a company, and the computing device is used by the merchant or the company.

In some embodiments, the method of FIG. 16 further includes receiving, from the DNS server, an indication that the email authentication information has been added to the DNS record associated with the domain. An example is step 426 of FIG. 11.

In some embodiments, the method of FIG. 16 further includes transmitting, to the platform, the indication that the email authentication information has been added to the DNS record associated with the domain. An example is step 428 of FIG. 11.

The receiving and transmitting steps described above in relation to FIG. 16 may be performed by a network interface, which is an example of a structure for transmitting and receiving communications over a network. Any instructing step (e.g. at step 628) may be performed by a processor that issues an instruction, which is subsequently transmitted over a network interface.

In some embodiments, methods are provided for removing $3^{rd}$ party email authentication information from a DNS record (e.g. as per the examples in FIGS. 13 and 14). For example, in a first step a message may be transmitted to a computing device. The computing device will be referred to as the trusted entity computing device. The message comprises a request to remove email authentication information from a DNS record associated with a domain. The domain may be associated with, belong to, and/or be used by a company. The message may be transmitted from a computing device associated with the company or a computing device associated with a $3^{rd}$ party. The message may be transmitted if the $3^{rd}$ party is no longer authorized to send emails on behalf of the company. In response, the trusted entity computing device instructs a DNS server to remove the email authentication information from the DNS record associated with the domain. In some embodiments, a reply may be received from the DNS server indicating that the email authentication information has been successfully removed. In some embodiments, the trusted entity computing device may transmit a message to the entity that requested that the email authentication information be removed (the company device or $3^{rd}$ party computing device) to confirm that the email authentication information has been successfully removed.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:
1. A computer-implemented method comprising:
receiving at least one message that identifies a domain;
transmitting, to a trusted entity computing device, a request to add, to a Domain Name System (DNS) record associated with the domain, email authentication information for authentication of emails sent on behalf of the domain, the request including: (i) the email authentication information and (ii) an indication of the domain;

receiving a response from the trusted entity computing device, the response indicating that the email authentication information has been added to the DNS record associated with the domain;

subsequent to receiving the response, instructing an email server to transmit an email from the domain.

2. The computer-implemented method of claim 1, wherein the email authentication information includes: an IP address and/or hostname of the email server, and/or a public key corresponding to a private key used by the email server.

3. The computer-implemented method of claim 1, further comprising:

transmitting, to a DNS server, a request for network location information of the trusted entity computing device; and receiving, from the DNS server, the network location information;

wherein the network location information is used to transmit, to the trusted entity computing device, the request to add the email authentication information to the DNS record.

4. The computer-implemented method of claim 3, wherein the network location information comprises an IP address of the trusted entity computing device.

5. The computer-implemented method of claim 1, wherein the at least one message includes an email address having the domain, wherein the domain is identified in the at least one message by the email address, and wherein instructing the email server to transmit the email from the domain comprises instructing the email server to transmit the email from the email address.

6. The computer-implemented method of claim 5, wherein the domain of the email address is the indication of the domain transmitted to the trusted entity computing device.

7. The computer-implemented method of claim 5, wherein the request transmitted to the trusted entity computing device includes the email address.

8. The computer-implemented method of claim 1, wherein the method is performed by a platform that sends the emails on behalf of the domain.

9. The computer-implemented method of claim 8, wherein the platform is an e-commerce platform.

10. The computer-implemented method of claim 8, wherein the request transmitted to the trusted entity computing device further includes authorization information indicating that the platform is authorized to send the emails of behalf of the domain.

11. The computer-implemented method of claim 10, wherein the authorization information is received in the at least one message.

12. The computer-implemented method of claim 1, wherein the domain is associated with a merchant or a company, wherein the at least one message is received from a computing device used by the merchant or the company, and wherein the at least one message serves as an indication that emails are to be sent on behalf of the domain.

13. A system comprising:

a processor to cause the system to receive at least one message that identifies a domain;

a memory to store the identification of the domain;

the processor further to cause the system to:

transmit, to a trusted entity computing device, a request to add, to a Domain Name System (DNS) record associated with the domain, email authentication information for authentication of emails sent on behalf of the domain, the request including: (i) the email authentication information and (ii) an indication of the domain;

receive a response from the trusted entity computing device, the response indicating that the email authentication information has been added to the DNS record associated with the domain;

subsequent to receiving the response, instruct an email server to transmit an email from the domain.

14. The system of claim 13, wherein the email authentication information includes: an IP address and/or hostname of the email server, and/or a public key corresponding to a private key used by the email server.

15. The system of claim 13, wherein the processor is further to cause the system to:

transmit, to a DNS server, a request for network location information of the trusted entity computing device; and receive, from the DNS server, the network location information;

wherein the network location information is used to transmit, to the trusted entity computing device, the request to add the email authentication information to the DNS record.

16. The system of claim 15, wherein the network location information comprises an IP address of the trusted entity computing device.

17. The system of claim 13, wherein the at least one message includes an email address having the domain, wherein the domain is identified in the at least one message by the email address, and wherein the processor is to instruct the email server to transmit the email from the domain by instructing the email server to transmit the email from the email address.

18. The system of claim 17, wherein the domain of the email address is the indication of the domain transmitted to the trusted entity computing device.

19. The system of claim 17, wherein the request transmitted to the trusted entity computing device includes the email address.

20. The system of claim 13, wherein the system is a platform that sends the emails on behalf of the domain.

21. The system of claim 20, wherein the platform is an e-commerce platform.

22. The system of claim 20, wherein the request transmitted to the trusted entity computing device further includes authorization information indicating that the platform is authorized to send the emails of behalf of the domain.

23. The system of claim 22, wherein the authorization information is included in the at least one message.

24. The system of claim 13, wherein the domain is associated with a merchant or a company, wherein the at least one message is received from a computing device used by the merchant or the company, and wherein the at least one message serves as an indication that emails are to be sent on behalf of the domain.

* * * * *